(No Model.) 3 Sheets—Sheet 1.
D. WILLIAMSON.
FILTER.
No. 514,531. Patented Feb. 13, 1894.
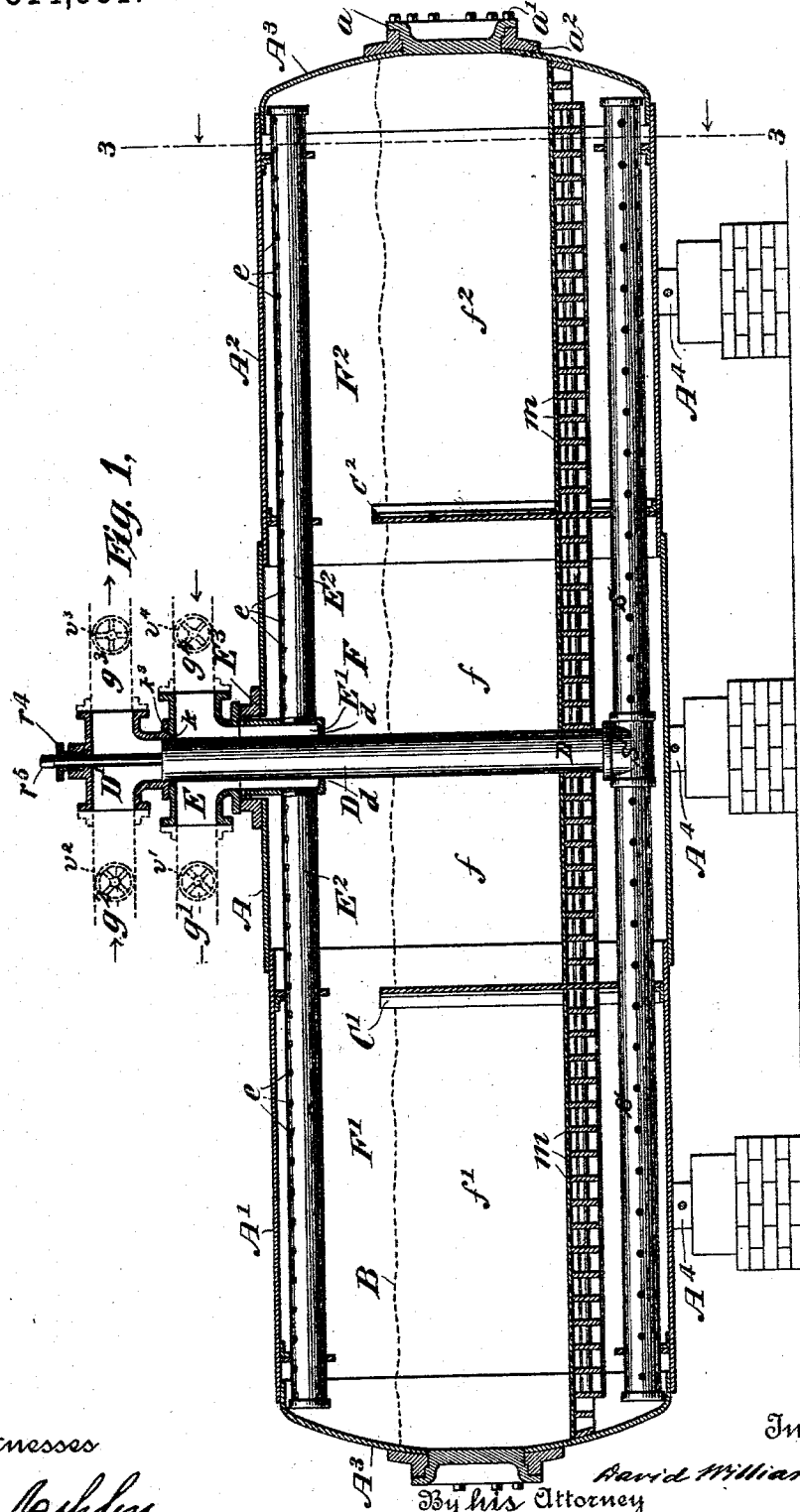
Witnesses
C. E. Ashley
H. W. Lloyd.
Inventor
David Williamson
By his Attorney
Willard Parker Butler (No Model.) 3 Sheets—Sheet 2.
D. WILLIAMSON.
FILTER.
No. 514,531. Patented Feb. 13, 1894.
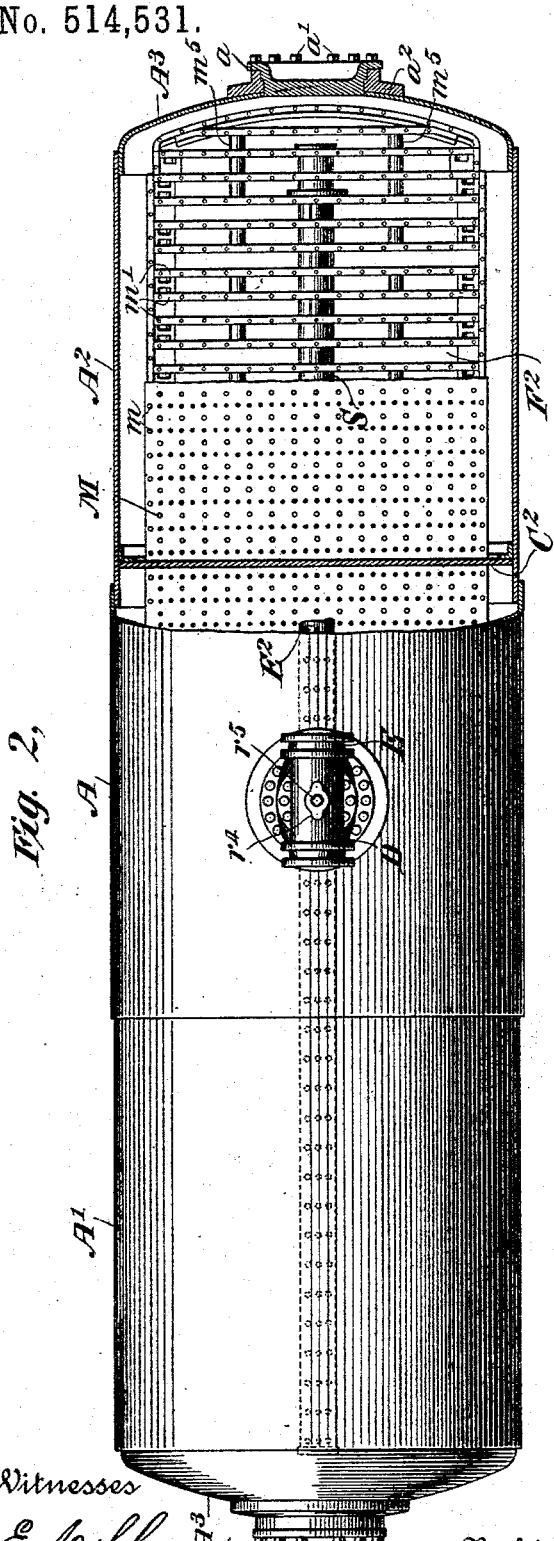
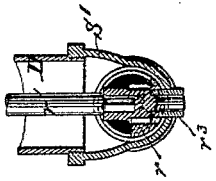
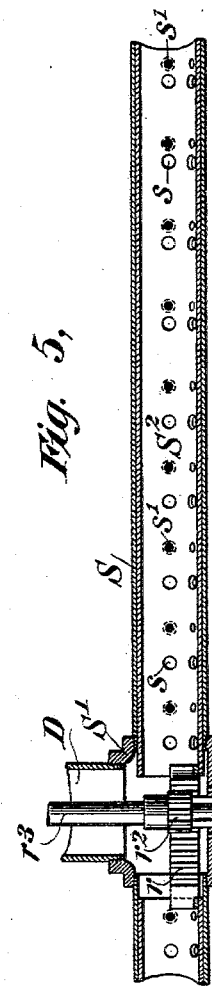
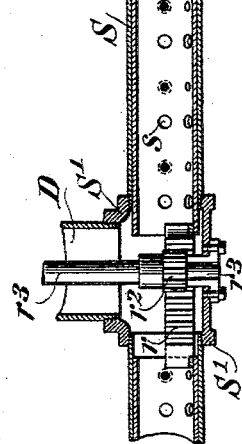
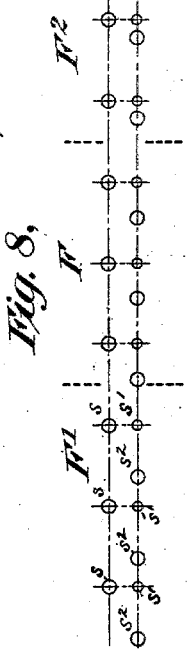
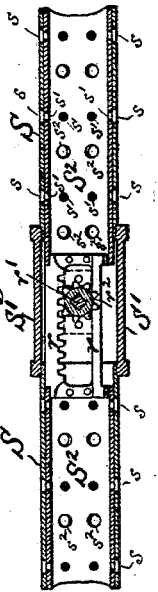
Witnesses
C. E. Ashley
H. W. Lloyd
Inventor
David Williamson
By his Attorney
Willard Parker Butler
THE NATIONAL LITHOGRAPHING COMPANY,
WASHINGTON, D. C.

(No Model.) 3 Sheets—Sheet 3.

D. WILLIAMSON.
FILTER.

No. 514,531. Patented Feb. 13, 1894.

Witnesses
C. E. Ashley
I. W. Lloyd.

Inventor
David Williamson
By his Attorney
Willard Parker Butler

UNITED STATES PATENT OFFICE.

DAVID WILLIAMSON, OF NEW YORK, N. Y., ASSIGNOR, BY DIRECT AND MESNE ASSIGNMENTS, TO WILBER McBRIDE.

FILTER.

SPECIFICATION forming part of Letters Patent No. 514,531, dated February 13, 1894.

Application filed December 28, 1892. Serial No. 456,548. (No model.)

*To all whom it may concern:*

Be it known that I, DAVID WILLIAMSON, a citizen of the United States, and a resident of the city of New York, in the county of New York and State of New York, have invented certain new and useful Improvements in Filters, of which the following is a specification.

My invention relates to an improvement in apparatus for filtering all kinds of liquids, and particularly to that class of filtering apparatus, which is known as high pressure filters, in which the liquid to be filtered is forced through the apparatus by means of pressure from any source or gravity.

The invention relates more particularly to that class of filters in which the filtration is effected in a downward direction through one or more suitable filter beds.

The object of the present invention is to provide more convenient means of cleansing the filter beds than has heretofore been practicable, and to consolidate and concentrate the supply and discharge pipes, with a view to reducing to a minimum the number of valves and connections employed, and to enable the apparatus to be controlled and manipulated as far as possible, from a central point in the system, and at the same time, by means of the construction of certain details of the interior parts of the apparatus to facilitate the removal and cleansing of the beds and the apparatus itself and to render the method of washing more effective.

The invention will be best understood by reference to the accompanying three sheets of drawings forming a part of this specification, in which—

Figure 9:
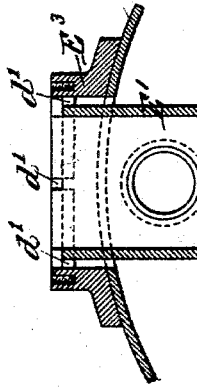
Figure 10:
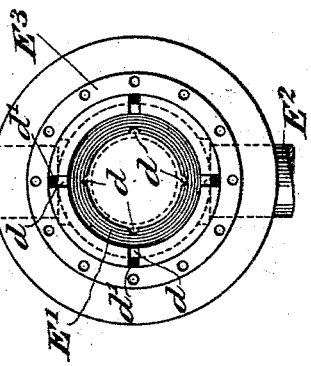
Figure 11:
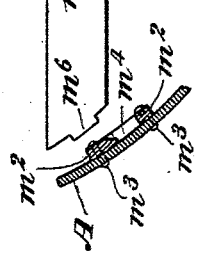
Figure 12:
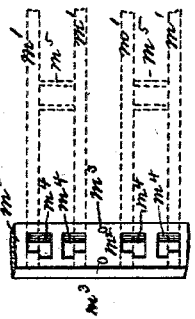
Figure 3:
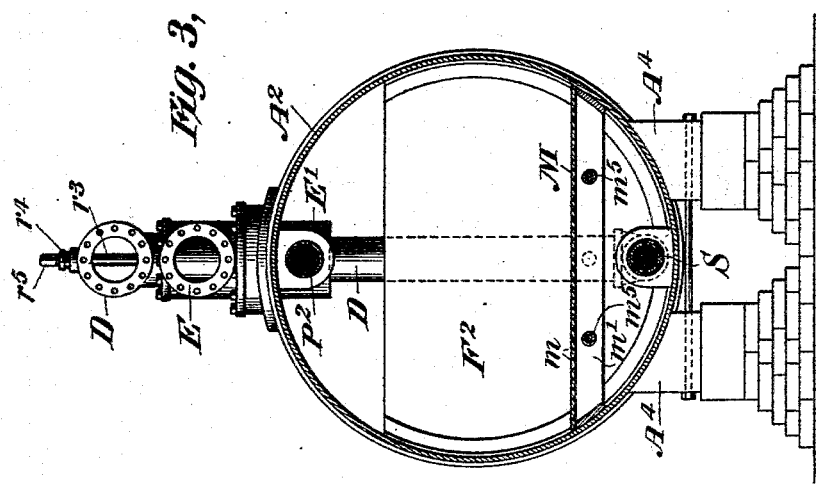

Figure 1 is a vertical longitudinal section of the apparatus. Fig. 2 is a plan view of the apparatus, showing a portion of the top broken away. Fig. 3 is a vertical section on the lines 3, 3 of Fig. 1. Figs. 4, 5, 6 and 7 are detail views of the mechanism employed for operating the washout system. Fig. 8 is a diagrammatic view showing the arrangements of ports in the washout pipe. Figs. 9 and 10 are vertical section and plan, respectively, of a collecting pot used in connection with the feed supply. Figs. 11 and 12 are detail views, in section and plan respectively, of the method of supporting the floors of the filter beds.

Similar letters refer to similar parts throughout the several views.

In the drawings, A represents the central shell of the filter, which is made of boiler iron or other suitable material, which is of cylindrical shape, and to it are added two sections $A'$, $A^2$ fitting in at either side, and terminating in the curved end walls or heads $A^3$. The diameter of these cylinders $A'$ and $A^2$ is somewhat less than the diameter of the cylinder A. As will be observed, this forms a cylindrical shell, which is divided into compartments, by means of the vertical diaphragms $C'$, $C^2$, which extend a convenient distance upward, preferably slightly above the level of the filter beds. In the drawings two are shown, forming three compartments. The shell of the filter may be supported on either end upon suitable frames or pillars of wood or masonry, on the wings or shoulders of iron, $A^4$ as shown in Figs. 1 and 3.

Each of the three compartments F, F' and $F^2$ thus formed, contains a filter bed designated by $f$, $f'$, $f^2$. These filter beds are supported in the compartments F, F' and $F^2$, formed within the three portions of the shell, by the two vertical diaphragms, $C'$, $C^2$ by means of a floor composed of a series of removable plates of sheet metal M, provided with the perforations $m$, of any convenient size. These plates are supported by a series of removable lateral girders or beams $m'$, as shown in Figs. 1, 3, 11 and 12. The ends of these girders fit into openings $m^4$, which are cut in a longitudinal plate $m^2$, which runs longitudinally along each side of each filtering compartment, as shown in Figs. 3 and 11, and is fastened to the shell A, A' or $A^2$, according to its position, by means of the rivets $m^3$, $m^3$. The extremities of each of the girders $m'$ are provided with a tongue $m^6$, which drops into the opening $m^4$, and may be pushed into the narrow portion of the opening so as to assume the position shown by the dotted lines in Fig. 2. Blocks $m^5$, composed of pieces of wrought iron pipe are driven in, between every two of the girders $m'$ shown in Fig. 12, so as to drive them apart and hold the ends firmly in the narrow part of the openings $m^4$ and the ends of the blocks are then bolted to the girders in any convenient manner. By means of this construction, when it is desired to remove the girder $m'$, it is only necessary to unbolt and knock out the block $m^5$ and push the adjacent girders together, whereupon their ends may be at once lifted out of the dovetailed openings $m^4$ and the floor thus removed. In this way the entire floor assumes a so called "knock down" construction, which will enable the whole or part of it to be readily removed at pleasure.

The liquid to be filtered enters at the top of the chamber F through the "T" joint E, connected on one side with a pipe entering from the reservoir containing the liquid to be filtered and on the other with a pipe leading to the waste water tank. Through the center of this "T" joint passes the discharge pipe D. The "T" joint E, terminates in what may be called a basket or pot E', from either side of which emerge horizontal pipes $E^2$. These are provided along their upper surface only, with one or more rows of horizontal openings $e$. The object of having these openings on the top of the pipe $E^2$ is to facilitate the distribution of the liquid to be filtered, over the entire upper surface of the filter beds. The basket or pot E' is shown in detail in Fig. 9. It is surrounded by a cylindrical casing $E^3$ on the outside of the shell, of slightly greater diameter than the pot, and there are four ports $d$ at the bottom of the pot, in close proximity to the discharge pipe D, which passes through it; and there are four additional ports $d'$ around the top of the pot at the upper extremity of a cylindrical space within the casing $E^3$ surrounding the upper part of the pot, through which space and ports, access to the interior of the pot can be had from entire inner portion of the compartments. A second "T" joint D' is provided resting upon the joint E and having two pipes—one entering either side arm, and leading the one to the reservoir of filtered water and the other to the washout water supply reservoir. The pipes $E^2$ emerge from the pot a slight distance above its base, as will be apparent from Fig. 9. The second "T" joint D' rests directly on top of the "T" joint E, and its vertical opening fits closely over the extremity of the vertical discharge pipe D. The packing $k$ is provided, shown in Fig. 1, upon which the projection $k^3$ engages for the purpose of making a tight joint along the extremity of the pipe D between the "T" joint D' and the "T" joint E. The supply and discharge pipes $g'$, $g^2$, $g^3$ and $g^4$ from these "T" joints are shown by dotted lines in Fig. 1 and may be provided with suitable valves at any convenient point or points.

The vertical discharge pipe D. terminates in a horizontal discharge pipe S., which extends through the central "T" joint S', as shown in Figs. 1, 5, 6 and 7.

The pipe S is provided with any convenient number of perforations upon its lower side, and contains in its interior a similar pipe $S^2$, of such diameter as will enable it to slide freely within the pipe S. This interior pipe is provided with any number of series of openings of a smaller diameter and differently spaced with reference to each other from those in the outer pipe S. These interior pipes $S^2$ $S^2$ engage with the toothed rack $r$ in which engages a gear wheel $r^2$, turned by a shaft $r^3$, passing upward through the discharge pipe D and through the "T" joint D', and terminating at its base in a bearing $r^4$ placed in the bottom of the "T" joint S'. By revolving the rod $r^3$, the pipes $S^2$ will be caused to slide horizontally within the pipe S, and the openings in the two pipes be made to assume any position with reference to each other that may be desirable.

Fig. 8 shows the arrangement of the ports in the washout pipe, in diagrammatic form. The letters F, F', $F^2$ indicate the three chambers. The upper dotted line indicates the line of the openings in the outer pipe, and the rings $s$ indicate the openings, of constant diameter, in said pipe. The lower dotted line represents the line of the openings in the inner pipe; and the smaller circles S' placed opposite the larger circles S, indicate a series of openings in the inner pipe, the aggregate diameter of which is equal to the whole area of the discharge pipe and when the openings S are brought opposite the openings S', the discharge is equal through all the three chambers.

The openings $s^2$ upon the lower line, indicate the openings which are used when it is desired that liquid be admitted into any one of the chambers. The position of these openings with reference to the slide of the pipe and the openings on the outer pipe, is different, and therefore when the pipe $S^2$ is moved a certain distance, the liquid is admitted into one chamber and cut off from the other two. And when it is moved a still farther distance, it is cut off from the first chamber and admitted into the second chamber. And when it is moved still farther, it is cut off from the first two chambers and admitted into the third chamber. In this way the entire volume may be admitted into any one of the chambers, as may be found most convenient, or the volume may be distributed equally through the three chambers.

The rod $r'$ passes upward through the "T" joint D' and out through the stuffing box $r^4$ which may be provided at its extremity with a square $r^5$ to receive a wheel or lever. The two interior pipes are caused to slide laterally any desired distance upon the rack $r$. The pipe S passes through close fitting openings in the vertical diaphragms C' $C^2$ as shown in Fig. 1. The ends or heads of the cylinder $A^3$ are each provided with a man-hole which is closed by a cap $a$ attached by suitable bolts $a'$. This cap is of the particular form shown in Fig. 1, and is so fitted into a circular plate $a^2$, attached to the curved end of the shell, that a continuous surface is formed upon the inside of the chamber between the curved part of the shell and the inner surface of the cover of the man-hole. The object of this is to prevent formation of pockets or angles which cannot be readily cleansed on the edges of the man-opening, when the compartment is washed out.

The operation of the filter is substantially as follows: When it is desired to filter a liquid, it is admitted through the "T" joint E, passes down and into the pot E', thence through the pipes $E^2$, and emerges through the openings $e$ and passes downward through the filter beds through the openings $m$ in the perforated floors M and enters the pipe S and passes up through the discharge pipe D, and thence out through the "T" joint D'. When it is desired to wash out the filter, the direction of the current is changed. The water is caused to enter through the pipe D, and emerge through the pipe S under the filter chambers, and then passes upward and out through the beds. By shifting the interior pipe $S^2$, the volume of water can be introduced into any one of the chambers or all of the chambers. The liquid emerging from the beds passes out through the pipes $E^2$ and out through the "T" joint E. By fitting the three portions of the shell together in the manner shown, a gradual flow of the current toward the center of the apparatus is effected, and by providing ports $d'$ $d'$ $d'$ $d'$ in the top of the pot, any sediment which is washed up from the filter beds and which cannot pass through the openings $e$, and out through the pipes $E^2$, will pass up through the ports $d'$ and be carried off through the discharging pipe. When the beds are being washed out, any particles of filtering material which is carried up and into the pipes $E^2$ $E^2$ will pass through them into pot E' and thence through the ports $d$ $d$ into the bottom of the pot, back into the bed. In this way it is possible to accumulate and save the small particles of the filter bed, after cleansing which are ordinarily washed out of the apparatus and lost. The filter beds may be of any convenient composition and any convenient height. Any number of chambers may be used, preferably however an equal number on each side of the central chamber; and to facilitate the flow toward the center, the construction of the apparatus should be such that the chambers grow slightly smaller in diameter as the distance from the center increases so that the highest point shall be in the center and any sediment not passing out through the pipes $E^2$ $E^2$ shall be washed up into the central casing $E^3$ and thence out into the discharge pipe E.

I claim as my invention—

1. In a filtering apparatus, the combination substantially as hereinbefore set forth, of the supply and discharge pipes placed in the center of the apparatus and the latter within the former, each terminating at the top in "T" joints similarly arranged with reference to each other, upon the outside of the apparatus and provided with suitable valves, whereby the system may be operated and controlled from a single central point.

2. In a filtering apparatus the combination with the filter bed, of a floor composed of perforated plates supported by girders running laterally across each chamber the ends of which are provided with inclined tongues arranged to fit into dovetailed recesses in a plate on the shell of the chamber and to be held within the narrow portions of the recesses by blocks placed between every two girders substantially in the manner described.

3. In a filtering apparatus the combination substantially as hereinbefore set forth, of the vertical discharge pipe D terminating in the joint S' below the filter bed, the perforated horizontal pipes S extending laterally through the compartments beneath the filter beds, the perforated sliding pipes $S^2$ within the pipe S the toothed rack $r$ connecting said pipes within the joint S' and the pinion wheel $r'$ engaging with said rack and the rod $r^3$ for rotating the pinion from the top of the apparatus.

4. In a filtering apparatus the combination substantially as hereinbefore set forth, with the vertical discharge pipe, and the horizontal pipes connected therewith of an interior pipe placed within the latter, arranged to slide laterally within the same a toothed sliding rack connected therewith, a pinion engaging with the teeth on the rack arranged to be turned by a rod passing upward through the vertical discharge pipe and out through the upper end of the same, for the purposes set forth.

5. In a filtering apparatus the combination substantially as hereinbefore set forth with the central chamber provided with auxiliary chambers on either side thereof and the separate chamber extending under the filter beds of a supply pipe provided with suitable valves for controlling the admission of liquid, placed in the central chamber from which lateral pipes extend into the spaces above side chambers, a discharge pipe passing vertically downward through the supply pipe to the space below the filter beds, and lateral pipes connected therewith at the lower end thereof extending under each filtering compartment.

6. In a filtering apparatus the combination with the central chamber of a basket or pot placed in the center and at the highest point thereof, a casing upon the outside of the shell, surrounding the said pot, and openings at the top of the latter whereby access may be had to the interior of the pot from the space within the casing and a "T" joint placed on top of the casing over said pot provided with pipes entering each arm of the joint through one of which the liquid to be filtered is introduced and through the other of which the washout liquid is carried off.

7. In a filtering apparatus the combination substantially as hereinbefore set forth, with the supply pipe of a basket or pot, placed in the center of the apparatus into which the liquid to be filtered is introduced and one or more horizontal supply pipes passing out of said pot into the upper portion of the side compartments at a point slightly above the bottom of the pot and one or more openings in the bottom of the pot for the purposes set forth.

8. In a filtering apparatus the combination substantially as hereinbefore set forth with the supply and discharge system of a basket or pot placed in the center of the system and in the center of the apparatus into which the liquid to be filtered is introduced one or more openings in the side walls at the top of the same for the purposes set forth from which pot horizontal supply pipes for the separate chambers emerge radially, and through which the discharge pipe from the bottom of the beds is carried up vertically but without opening into the same.

9. In a filtering apparatus, the combination substantially as hereinbefore set forth, with the casing on the outer shell of the apparatus of the "T" joint through which the liquid to be filtered is introduced and the wash-out liquid removed of a second "T" joint placed on top of the same, provided with pipes entering each horizontal arm one leading to the reservoir containing the filtered liquid and the other from the wash-out supply, and a vertical discharge pipe passing downward from the lower arm of the joint and through the first "T" joint and to the bottom of the apparatus.

In testimony that I claim the foregoing as my invention I have signed my name, in presence of two witnesses, this 17th day of December, A. D. 1892.

DAVID WILLIAMSON.

Witnesses:
WILLARD PARKER BUTLER,
HENRY B. ANDERSON.